United States Patent [19]
Fleischhacker et al.

[11] 3,906,982
[45] Sept. 23, 1975

[54] PRESSURE REGULATOR ASSEMBLY

[75] Inventors: Joseph F. Fleischhacker, Minnetonka; Thomas W. Hruby, Minneapolis, both of Minn.

[73] Assignee: Tescom Corporation, Minneapolis, Minn.

[22] Filed: May 20, 1974

[21] Appl. No.: 471,569

Related U.S. Application Data

[62] Division of Ser. No. 284,253, Aug. 28, 1972, Pat. No. 3,812,877.

[52] U.S. Cl. ................................. 137/116.5
[51] Int. Cl.² ................................ G05D 16/06
[58] Field of Search ............... 137/116.5, 505.11

[56] References Cited
UNITED STATES PATENTS

| | | | |
|---|---|---|---|
| 2,894,526 | 7/1959 | Booth et al. .................. | 116.5 |
| 3,556,125 | 1/1971 | Dowdall ................... 13 | X |
| 3,712,333 | 1/1973 | Semon ................... 13 | |

*Primary Examiner*—Robert G. Nilson
*Attorney, Agent, or Firm*—Dugger, Johnson & Westman

[57] ABSTRACT

A pressure regulator assembly that includes a v. body, a bonnet mounted on the body and in combination with the body mounting a flexible diaphragm to separate the body control chamber and bonnet chamber, a nozzle and back cap mounted by the body to provide an inlet chamber, a valve stem assembly extended through the inlet chamber and nozzle and resiliently urged toward the bonnet to block fluid flow through the nozzle to the control chamber, a centering disc abutting against the diaphragm and the valve stem assembly to in cooperation with a spring coiled about a circular axis retain the valve stem assembly radially spaced from the nozzle bore and back cap bore, a filter screen in the inlet chamber, and spring mechanism in the bonnet resiliently urging the diaphragm toward the back cap. In one embodiment an eyelet secures the diaphragm support plate to the diaphragm, and in combination with an integral, raised, annular ring portion (boss) on the diaphragm side of the centering disc and abutting against the diaphragm in surrounding relationship to the eyelet provides for a self-relieving feature, while in the second embodiment the diaphragm support plate is not secured to the diaphragm and no raised ring portion is provided on the diaphragm side of the centering disc. In the second embodiment an adjustment knob is threaded to the bonnet and has part of the adjusting spring extended a substantial distance into the knob bore for the purpose of providing more space for the adjusting spring without increasing the size of the bonnet.

8 Claims, 5 Drawing Figures

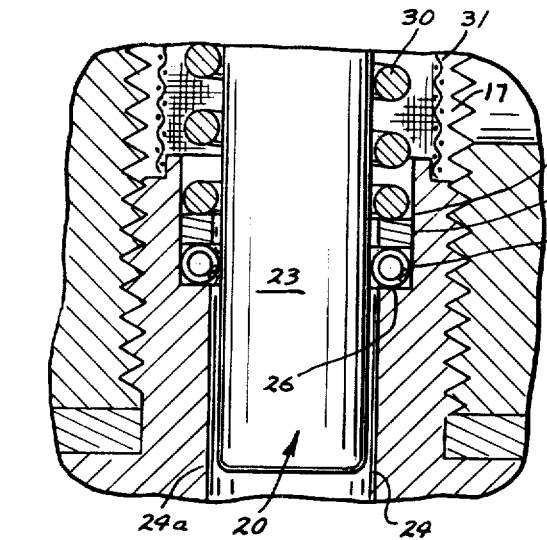
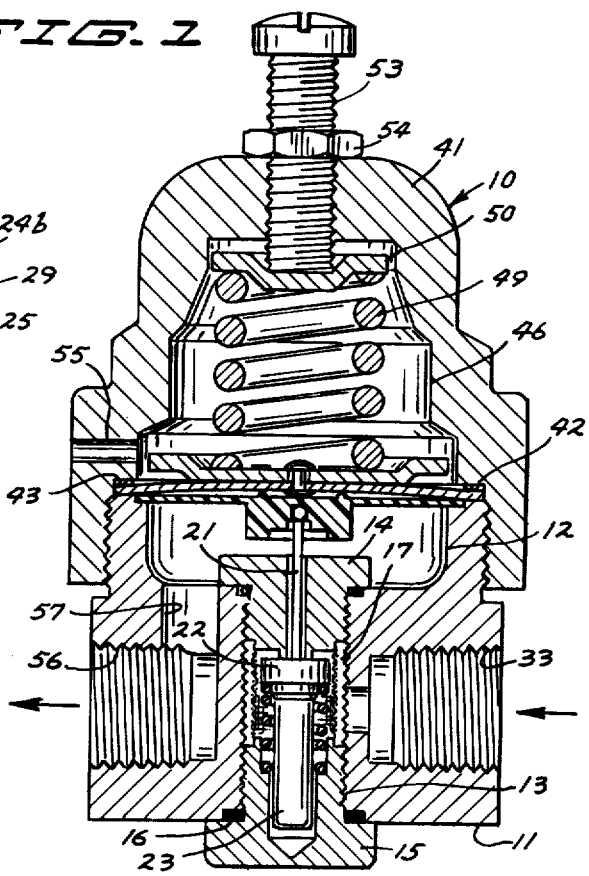
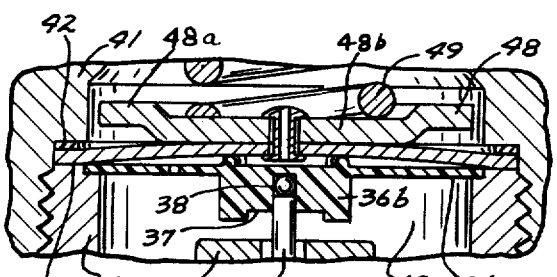
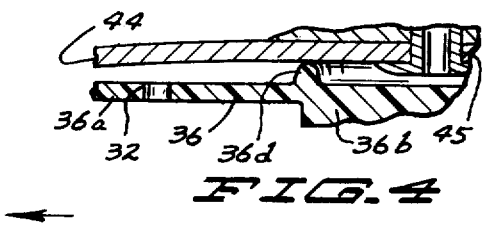

3,906,982

PRESSURE REGULATOR ASSEMBLY

RELATED APPLICATIONS

This application is a divisional application of our co-pending application Ser. No. 284,253, filed Aug. 28, 1972, now U.S. Pat. No. 3,812,877.

BACKGROUND OF THE INVENTION

A pressure regulator assembly having a valve stem resiliently urged against a diaphragm which is urged in an opposite direction by spring adjustment mechanism to provide and maintain fluid at a desired pressure at the assembly outlet.

In the prior art there has been metal to metal contact through a substantial axial length of a valve stem between the valve stem and valve body, or cap secured to the valve body, which impedes the opening and closing movement of the valve stem. Further, there is a problem of maintaining the valve stem in a "centered" condition. As a result, there is greater than desired frictional contact between the valve stem and the remainder of the regulator. In order to minimize disadvantages of prior art regulators such as mentioned above, as well as others, this invention has been made.

SUMMARY OF THE INVENTION

A pressure regulator assembly having a valve body, a bonnet mounted on the body and mounting a diaphragm to separate the body control chamber and bonnet chamber and a resilient centering disc to aid in retaining the valve stem assembly in a centered condition relative the nozzle bore both in a valve stem open condition permitting fluid flow from the inlet chamber, through the nozzle bore and to the control chamber, and a closed condition blocking fluid flow from the inlet chamber to the control chamber.

One of the objects of the invention is to provide new and novel mechanism in a pressure regulator for aiding in retaining the valve stem in a centered condition with a relatively small area of contact with the remainder of the regulator assembly that restrains other than reciprocal movement of the valve stem assembly. In furtherance of the above it is additional objects of the invention to provide centering mechanism movable with the regulator diaphragm toward the valve stem assembly to retain the adjacent end portion of the valve stem assembly in a centered condition, and spring mechanism to retain the opposite end portion of the valve stem assembly in a centered condition to eliminate all contact with the radial adjacent portions of the wall defining the bore of the regulator assembly in which the valve stem assembly opposite end portion is reciprocally mounted.

An additional object of this invention to provide in a pressure regulator, new and novel mounting of the spring mechanism that adjustably controls and maintains the pressure of fluid at the outlet of the regulator. Another object of this invention is to provide a filter screen in the inlet chamber of a pressure regulator assembly to block the movement of particles from the assembly inlet to the nozzle bore.

BRIEF DESCRIPTION OF THE DRAWINGS

FIG. 1 is a cross-sectional view of the first embodiment of the pressure regulator assembly of this invention;

FIG. 2 is an enlarged fragmentary cross-sectional view of the assembly of FIG. 1, said view more clearly illustrating the mounting of the valve stem assembly plunger in the back cap;

FIG. 3 is an enlarged, fragmentary cross-sectional view of a portion of the assembly of FIG. 1, said view more clearly illustrating the mounting of the control rod of the valve stem assembly;

FIG. 4 is a still further enlarged, fragmentary cross-sectional view of a portion of the assembly of FIG. 1 to more clearly illustrate the self-relieving feature; and FIG. 5 is a cross-sectional view of the second embodiment of the pressure regulator assembly of this invention.

Referring now in particular to FIGS. 1–4, the first embodiment of this invention, generally designated 10, includes a valve body 11 having a control chamber 12 opening through one surface thereof, and an axially elongated threaded bore 13 that one end opens to the control chamber and at the opposite end opens through the opposite surface of the valve body. A nozzle 14 has a threaded end portion threadedly extended into the bore 13 and an enlarged diametric portion located within the control chamber. In the opposite end of bore 13, there is threadedly extended the one end portion of the plug or back cap 15, the back cap having an enlarged diametric portion bearing against the aforementioned opposite surface of the valve body. An O-ring 16 is provided on the threaded end portion of the back cap to form a fluid seal between the back cap and valve body, and on the thread portion of the nozzle to form a fluid seal between the adjacent surfaces of the nozzle and the valve body. The adjacent surfaces of the nozzle and back cap are substantially spaced to in conjunction with the portion of bore 13 axially therebetween provide an inlet chamber 17.

A valve stem assembly, generally designated 20 includes an axially elongated control rod 21 that extends through the nozzle bore which at one end opens to the chamber 12 and at the opposite end to the chamber 17. One end of the control rod is integrally joined to one surface of the valve head 22 which is located within chamber 17, the opposite end of valve head 22 being integrally joined with one end of an axially elongated plunger 23. The plunger 23 has its opposite end portion slidably extended into the bore 24 provided in the back cap which does not extend all the way through the back cap, but does open to chamber 17. Bore 24 has a constant diameter portion 24A and an enlarged diametric portion 24B, portion 24B opening to chamber 17. Mounted within bore portion 24B to abut against the shoulder 26 formed by bore portions 24A, 24B is garter spring 25. Spring 25 is coiled about a circular axis whereby one arcuate edge portion of each coil of the spring normally lightly abuts against the plunger 23 and the diametric opposite arcuate edge portion normally is spaced from the wall defining bore portion 24B, the outside diameter of each coil being greater than the difference between the diameters of bore portion 24B and 24A. Spring 25 only very slightly resists reciprocal movement of the plunger. Additionally, the diameter of plunger 23 is significantly smaller than the diameter of bore portion 24A whereby spring 25 functions to retain the plunger out of contact with the wall defining bore 24A.

In order to retain spring 25 in abutting relationship with the shoulder 26, a valve stem washer 29 is provided in bore portion 24A in surrounding relationship to plunger 20, the inside diameter of the washer 29 being substantially larger than the diameter of the plunger and the outside diameter being such to form a close fit with the adjacent part of the wall defining bore portion 24B to prevent any substantial radial movement of the washer. For retaining washer 29 in abutting relationship with spring 25 and resiliently retaining spring 25 in abutting relationship with shoulder 26, there is provided a coil spring 30 in surrounding relationship to plunger 23 that has one end abutting against washer 29 and an opposite end abutting against the valve head 22 for resiliently urging the valve stem assembly to move in a direction away from the back cap 15. Mounted in chamber 17 in surrounding relationship to valve spring 30 is an annular filter screen 31 that forms a close fit with the minimum diameter portion of bore 13, the back cap having an annular flange projecting into one end portion of the filter screen while the nozzle has an annular portion projecting into the other end portion of the filter screen to provide a positive end dust seal at the other end of the screen and aid in maintaining the filter screen in a fixed position within the valve body. The inside diameter of the filter screen is larger than the diameter of the valve head 22 to provide an annular fluid passage space while the outside diameter of the filter screen is only slightly smaller than the diameter of the minimum thread edges of bore 13, the fluid passage between the bore wall defining the threads and the filter screen being provided mainly by the threads.

The valve body is provided with an inlet bore 33 that at one end opens to the chamber 17 between the filter screen and the wall defining bore 17, and at the opposite end is threaded and opens outwardly through the valve body to have a suitable conduit threadedly connected thereto for supplying gas under pressure to bore 17.

An annular recess is provided in the valve body in surrounding relationship to chamber 12 at the end remote from the back cap, the peripheral edge portion of a resilient plastic centering disc 36 being seated in said recess. The centering disc has a relatively thin annular portion 36A and a central generally cylindrical portion 36B that is of an axial thickness many times greater than the axial thickness of annular portion 36A. Portion 36B extends in a direction toward the nozzle and has downwardly opening notches 37 extending across portion 36B for purposes to be set forth hereinafter. A bore 38, which does not extend through the disc, is formed in the central part of portion 36B to open toward the nozzle, the bore being of a diameter to form a close fit with rod 21. A metal ball is provided in bore 38 to have one end of the rod 21 bear thereagainst for providing a wearing surface.

A valve bonnet 41 is threaded on the externally threaded annular part of the valve body that surrounds chamber 12, the bonnet having a chamber 46 that opens toward chamber 12 when the bonnet is threaded on the valve body. A diaphragm washer 42 is seated against the internal shoulder 43 of the bonnet to have the annular peripheral edge portion of the diaphragm 44 abut thereagainst. The opposite annular surface portion of the diaphragm abuts against the valve body and may in part abut against the outer peripheral edge portion of the centering disc that is opposite the shoulder in the valve body in which the centering disc is seated to hold the disc in a seated position. An eyelet 45 is extended through central apertures formed in the backup member 48 and the diaphragm for securing the backup member to the diaphragm opposite the centering disc. The centering disc has an annular boss 36D on its central portion projecting axially to abut against the diaphragm on the side opposite the backup member; said boss being located radially intermediate the eyelet and the outer peripheral edge of the centering disc.

The centering disc is provided with an aperture 32 radially between boss 36D and the outer peripheral edge of the centering disc, said aperture extending through portion 36A to permit fluid flow from the control chamber to the space between the disc and diaphragm radially outwardly of the boss, while the aperture extending through the eyelet permits fluid flow from the above mentioned space to the bonnet chamber when the pressure in the control chamber is too high. One or more apertures 55 are provided in the bonnet to place the bonnet chamber in fluid communication with the ambient atmosphere. As a result of the above, the regulator incorporates a self-relieving feature. No openings are provided through the centering disc other than for aperture 32.

One end of the coil spring 49 is seated against the backup member (diaphragm support plate) 48 for resiliently urging the backup member toward the cap 15 and an opposite end seated against the spring button 50 which in turn abuts against the end of the adjusting screw 53. As may be noted in FIG. 1, the chamber 46 has an axially elongated portion of a diameter of a substantially larger diameter than the backup member to permit limited axially movement of the backup member. Further, the outer diameter of the backup member is about the same as that of the chamber 12. The backup member has a radially outer annular portion 48A located more remote from chamber 12 than the inner annular portion 48B, the diameter of portion 48B being smaller than that of chamber 12.

An adjusting screw 53 is threaded into the bonnet for abutting against the surface of the button 50 opposite spring 49, there being provided a lock nut 54 on the screw for retaining the screw in an adjusted threaded condition.

A threaded outlet bore 56 is formed in the valve body to have an outlet conduit threadedly connected thereto, bore 56 being placed in fluid communication with chamber 12 by a bore 57 that opens to said chamber at a location remote from the nozzle bore.

Not previously noted is that the diameter of the connecting rod 21 is substantially smaller than that of the nozzle bore through which it extends, while the nozzle has an annular portion which forms a valve seat that is abuttable against the piston to form a fluid seal therewith to prevent fluid flow from the chamber 17 through the nozzle bore to chamber 12.

Referring to FIG. 5, the second embodiment of the invention, generally designated 70, includes a valve body 71, a nozzle 72, a plug or back cap 73, a valve stem assembly generally designated 74, a garter spring 75, a washer 76, and a spring 77 that are of the same construction and function in the same manner as members 11, 14, 15, 20, 26, 29 and 30 respectively of the first embodiment. A plastic centering disc 79 has its peripheral portion seated on an annular shoulder that surrounds the control chamber 12 of the valve body, the centering disc 79 being of the same construction as centering disc 36 other than disc 79 does not have an annular boss that abuts against the diaphragm 44. A flexible, imperforated diaphragm 80 in part seats against the annular flange surrounding chamber 12 and is adjacent to the surface of the centering disc that is remote from the nozzle, a diaphragm washer 81 being mounted in abutting relationship with the outer peripheral portion of the diaphragm on the side opposite the valve body. The diaphragm washer seats in an angular shoulder formed in the annular bonnet 82, the valve body having exterior threads for forming a threaded connection with one threaded end portion of the bonnet. Located within the central bore 83 of the bonnet is a diaphragm backup (diaphragm support plate) 84 having a reduced diameter portion in abutting relationship with the central portion of the diaphram on the side opposite the centering disc. The diaphragm backup is resiliently retained in abutting relationship with the diaphragm through the provision of a coil spring 85 that has one end abutting against the diaphragm backup and an opposite end abutting against a spring button 86. The button 86 is resiliently retained in engagement with the internal protrusion 89A of the adjusting knob 89, the protrusion protruding into the chamber 90 of the knob. The outer surface portion of the annular wall defining chamber 90 is provided with exterior threads that form a threading fit with the interior threads of the end portion of the bonnet opposite the valve body. As may be noted spring 85 extends within the chamber 90.

The bonnet is provided with a plurality of apertures 92 having one ends opening through the exterior surface of of the bonnet and at the opposite end open into the bonnet bore 83 to permit the bonnet bore being in fluid communication with the ambient atmosphere, regardless of the adjusted threaded position of the adjusting knob relative the bonnet.

In using the first embodiment of the invention, with fluid under pressure being applied at inlet 33, and the outlet 56 being fluidly connected to the apparatus that is to be maintained at a desired pressure, screw 53 is rotated in the appropriate direction for setting the desired pressure at the outlet. At the time the pressure at the outlet is at the desired level, the force exerted upon the diaphragm by the fluid in chamber 12 is in equilibrium with that of the pressure exerted on the diaphragm by the bonnet spring and accordingly the valve piston abuts against nozzle to block fluid flow from the inlet 33 to nozzle bore. However, upon decreased pressure in the outlet, the central portion of the diaphragm is flexed toward the nozzle, which through the centering disc and rod 21 of the valve stem assembly pushes the valve head 22 away from the nozzle. As a result, fluid under pressure from the inlet flows through the nozzle bore to the control chamber for re-establishing and maintaining the desired fluid pressure at the outlet.

If a lower pressure is desired at the outlet 56, screw 53 is turned in the appropriate direction and as a result, the diaphragm flexes away from nozzle 14 toward a datum position. As the diaphragm flexes away from the nozzle, the spring 30 urges the valve assembly to move toward the bonnet, and as a result the one end portion of the valve rod 21 remains in abutting relationship with the wall defining bore 38. Thus, the centering disc retains the rod 21 in a center condition as the valve stem assembly is reciprocated between a position blocking fluid flow through the nozzle bore and a position permitting fluid flow through said bore. Similarly, spring 25 retains the valve stem assembly portion 23 out of contact with bore 24 as the valve stem assembly is reciprocated between its positions.

The centering disc has notches 37 to permit fluid flow from the nozzle bore to and through the control chamber, even though the centering disc has been moved sufficiently to abut against the nozzle.

In the event the pressure in the control chamber should be substantially higher than desired, for example, as a result of rotating screw 53 for a lower desired outlet pressure, the fluid pressure acting through aperture 32 results in the diaphragm and centering disc relatively moving to break the fluid seal between boss 36D and the diaphragm whereupon fluid in the control chamber flows through bore 32 to the space between the diaphragm and centering disc, thence through the aperture in the eyelet 45 to the bonnet chamber, and thereafter through bonnet aperture 55. Upon the pressure in the control chamber dropping a sufficient amount, the centering disc and diaphragm relatively move to positions that the diaphragm abuts against boss 36D to form a fluid seal which prevents further fluid flow through aperture 32 to the space between the centering disc and diaphragm that is within the confines of the annular boss 36D.

The operation of the second embodiment is the same as the first embodiment, other than for the self-relieving feature, i.e. the second embodiment does not include an eyelet 45, nor the annular boss 36D on the centering disc such as described with reference to the first embodiment. However, due to the provision of an adjusting knob having a spring extended into its bore, and the adjusting knob being threadably extended into the bonnet, provision is made for use of a longer spring than is possible with the first embodiment wherein the axial length of the bonnet of the two embodiments is substantially the same. Of course, the self-relieving feature can be incorporated in the second embodiment.

In both of the embodiments, the springs 25 and 75 respectively bear against the valve stem assembly plunger with sufficient force to provide the friction necessary to prevent vibration (undesirable valve oscillation) of said assembly as well as acting in conjunction with the centering disc to precisely center the assembly to eliminate sliding contact with any other part of the regulator. Such sliding contact, if present, could produce excessive friction that would result in the regulator malfunctioning or functioning poorly.

Another advantage resulting from precisely centering the valve stem assembly is that there is obtained improved seating of the valve head of the valve stem assembly against the nozzle. With reference to seating, the individual turns of spring 25 (75) quickly wear minute grooves into the plunger of the respective embodiment which further improves the seating by preventing rotation of the valve stem assembly during use.

What is claimed is:

1. A pressure regulator assembly comprising a valve body having a control chamber, and outlet and inlet passageways opening to the control chamber in spaced relationship to one another, a bonnet mounted on the valve body and having a bonnet chamber opening toward the control chamber, a diaphragm mounted by the bonnet and valve body for separating the control chamber from the bonnet chamber, first means mounted by the bonnet and extending within the bonnet chamber for resiliently urging the diaphragm toward the control chamber, a nozzle mounted by the body, extending within the inlet passageway and having a bore extending therethrough to permit passage of fluid through the inlet passageway to the control chamber, a plug mounted by the body, extending into the inlet passageway remote from the nozzle and having a plug bore, a valve stem assembly extending within the inlet passageway and through the nozzle bore, said valve stem assembly having a first elongated portion extended through the nozzle bore and into the control chamber; and a second elongated end portion extending into the plug bore, said first assembly portion and second end portion being of cross sectional areas to provide annular clearance spaces with the nozzle and plug bores respectively, said valve stem assembly first portion having a valve stem end portion, said valve stem assembly being mounted for reciprocal movement between a first position permitting fluid flow to and through the nozzle bore to the control chamber and a second position blocking fluid flow to and through the nozzle bore to the control chamber, second means within the inlet passageway for resiliently urging the valve stem assembly to its second position, and third and fourth means abutting against the first and second end portions respectively for centering the valve stem assembly relative the plug and nozzle bores while permitting reciprocal movement of the valve stem assembly, said third means being in abutting relationship with the diaphragm and including a resilient centering disc having a peripheral edge portion mounted between the diaphragm and valve body and extending across the control chamber, a central portion having a wall defining a recess for centering the first portion relative the nozzle bore, said valve stem end portion extending into said recess in close fitting relationship with the wall defining the recess, and a boss extending toward the diaphragm to space a surrounding portion of the diaphragm from the rest of the centering disc, and an aperture spaced from the boss to place the part of the control chamber on the opposite side of the centering disc from the diaphragm in fluid communication with the space between the diaphragm and centering disc, said diaphragm having an aperture extending therethrough that opens to the space surrounded by said boss, and being movable relative the boss between a first position blocking fluid flow through said disc aperture to said diaphragm paerture and a position for providing a fluid flow path from the disc aperture, through the diaphragm aperture and to the bonnet chamber, said bonnet having a vent aperture opening to the bonnet chamber.

2. A pressure regulator assembly comprising a valve body having a control chamber, and outlet and inlet passageways opening to the control chamber in spaced relationship to one another, a bonnet mounted on the valve body and having a bonnet chamber opening toward the control chamber, a diaphragm mounted by the bonnet and valve body for separating the control chamber from the bonnet chamber, first means mounted by the bonnet and extending within the bonnet chamber for resiliently urging the diaphragm toward the control chamber, the first means including a diaphragm backup member, said diaphragm and backup member having central portions, an eyelet fixedly attaching the diaphragm and backup member central portions to one another, and having an aperture extending therethrough that opens on the opposite side of the diaphragm from the backup member and to the bonnet chamber, a nozzle mounted by the body, extending within the inlet passageway and having a bore extending therethrough to permit passage of fluid through the inlet passageway to the control chamber, a plug mounted by the body, extending into the inlet passageway remote from the nozzle and having a plug bore, a valve stem assembly extending within the inlet passageway and through the nozzle bore, said valve stem assembly having a first elongated portion extended through the nozzle bore and into the control chamber; and a second elongated end portion extending into the plug bore, said first portion and second end portion being of cross sectional areas to provide annular clearance spaces with the nozzle and plug bores respectively, said valve stem assembly being mounted for reciprocal movement between a first position permitting fluid flow to and through the nozzle bore to the control chamber and a second position blocking fluid flow to and through the nozzle bore to the control chamber, second means within the inlet passageway for resiliently urging the valve stem assembly to its second position, and third and fourth means abutting against the first portion and second end portion respectively for centering the valve stem assembly relative the plug and nozzle bores while permitting reciprocal movement of the valve stem assembly, said third means being in abutting relationship with the diaphragm, and including a resilient centering disc mounted in the control chamber in abutting relationship with the diaphragm, said disc having a peripheral edge portion abutting against the valve body and a central portion having a recessed wall portion defining an aperture that forms a close fit with the valve stem first end portion, said first portion extending into the disc aperture, said plug bore having an annular recessed portion opening toward the valve stem assembly second end portion, and the fourth means including a spring coiled about a circular axis that abuts against the valve stem assembly second portion for holding the second end portion of contact with a wall defining said plug bore as the valve stem assembly moves from its first position to its second position, said spring abutting against a wall portion of said wall that defines said annular recessed portion.

3. The apparatus of claim 2 further characterized in that the disc has a central portion, that the bonnet has a vent aperture placing the bonnet chamber in fluid communication with the ambient atmosphere, that the eyelet aperture places the bonnet chamber in fluid communication with the space between the central portions of the diaphragm and centering disc and that the centering disc has a boss abuttable against the diaphragm in surrounding relationship to the eyelet to form a fluid seal with the diaphragm and a second aperture extending through the disc to place the control chamber in fluid communication with the space between the diaphragm and centering disc on the transverse opposite side of the boss from the eyelet to permit fluid flow from the control chamber to the bonnet chamber when the diaphragm is out of fluid sealing relationship with the boss.

4. A regulator assembly comprising a valve body having a control chamber and inlet and outlet passageways opening to said control chamber in spaced relationship to one another, a bonnet having a bonnet chamber, a diaphragm, a plastic resilient centering disc, said diaphragm and disc having outer peripheral edge portions and central portions, said bonnet being secured to the valve body for mounting the peripheral edge portions in fixed relationship to the valve body with the diaphragm separating the bonnet chamber from the control chamber and the centering disc abutting against the diaphragm with the diaphragm on the opposite side of the centering disc from the control chamber, operable valve means in the inlet passageway operable between a first position permitting fluid under pressure flowing into the control chamber and a second position blocking fluid under pressure flowing into the control chamber, means for resiliently urging the valve means to the second position, selectively adjustable means extending in the bonnet chamber for resiliently urging the diaphragm toward the valve means, said resilient urging means including a backup member abutting against the diaphragm, and an eyelet extending through the central portions of the diaphragm and backup member, and fixedly securing said central portions together, said eyelet having an aperture placing the bonnet chamber in fluid communication with the space between the disc and diaphragm, said centering disc having a boss extending toward the diaphragm, and abuttable thereagainst in surrounding relationship to the eyelet aperture to form a fluid seal with the diaphragm, said disc having an aperture extending therethrough to pass fluid from the control chamber to the space between the disc and diaphragm and than through the eyelet aperture when the diaphragm is out of abutting relationship with the boss and blocking fluid flow from the disc aperture to the eyelet aperture when the diaphragm abuts against the boss, said valve means abutting against the centering disc and being operable thereby from the second position to its first position.

5. The apparatus of claim 4 further characterized in that valve means includes a nozzle having a nozzle bore extending therethrough and opening to the control chamber, a valve stem assembly having a control rod extending through the nozzle bore and being of a substantially smaller cross sectional area than the nozzle bore, and that the centering disc has a central recess opening toward the nozzle, having the control rod extended thereinto, and forming a close fit with the adjacent part of the control rod to aid in retaining the control rod in a centered position relative the nozzle bore.

6. The apparatus of claim 5 further characterized in that the valve means includes a plunger, a plunger bore having a plunger slidably extended into the plunger bore, said plunger having a portion of a substantially smaller cross sectional area than the plunger bore and extending thereinto and a spring coiled about a circle axis extending around said plunger portion for positioning the plunger in a centered position relative the plunger bore.

7. The apparatus of claim 6 further characterized in that the valve means includes a valve stem assembly having the plunger and control rod, and a plug having said plunger bore, said plunger bore having a shoulder abutting against said spring, and that the first mentioned resiliently means includes a washer surrounding the plunger, having a substantially larger inside diameter than the diameter of the plunger, and abutting against the spring on the side opposite the shoulder, and spring means bearing against the washer to resiliently urge the washer toward the shoulder and the valve stem assembly toward the diaphragm.

8. The apparatus of claim 6 further characterized in that the valve body has a body bore opening to the control chamber, said nozzle being mounted in the body bore, that the valve means includes a plug mounted in the body bore in spaced relationship to the nozzle to provide an inlet chamber forming part of the inlet passageway, said inlet passageway including an inlet bore opening to the inlet chamber, and that there is provided a filter screen in the inlet chamber through which fluid has to flow in passing from the inlet bore to the nozzle bore.

* * * * *

UNITED STATES PATENT AND TRADEMARK OFFICE
CERTIFICATE OF CORRECTION

PATENT NO. : 3,906,982
DATED : September 23, 1975
INVENTOR(S) : Joseph F. Fleischhacker and Thomas W. Hruby It is certified that error appears in the above-identified patent and that said Letters Patent are hereby corrected as shown below:

Column 8, line 41, after "second end portion" insert --out--

Signed and Sealed this sixth Day of January 1976

[SEAL]

Attest:

RUTH C. MASON
Attesting Officer

C. MARSHALL DANN
Commissioner of Patents and Trademarks